US012146496B2

(12) United States Patent
Ishibashi et al.

(10) Patent No.: US 12,146,496 B2
(45) Date of Patent: Nov. 19, 2024

(54) PROPELLER FAN AND REFRIGERATION APPARATUS

(71) Applicant: DAIKIN INDUSTRIES, LTD., Osaka (JP)

(72) Inventors: Tomohiro Ishibashi, Osaka (JP); Zuozhou Chen, Osaka (JP); Anan Takada, Osaka (JP); Kaname Maruyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/244,001

(22) Filed: Sep. 8, 2023

(65) Prior Publication Data

US 2023/0417249 A1 Dec. 28, 2023

Related U.S. Application Data

(63) Continuation of application No. PCT/JP2022/009150, filed on Mar. 3, 2022.

(30) Foreign Application Priority Data

Mar. 12, 2021 (JP) ................................ 2021-040365

(51) Int. Cl.
*F04D 29/38* (2006.01)
*F04D 19/00* (2006.01)

(52) U.S. Cl.
CPC ......... *F04D 19/002* (2013.01); *F04D 29/384* (2013.01); *F05D 2240/304* (2013.01)

(58) Field of Classification Search
CPC .... F04D 19/002; F04D 29/384; F04D 29/326; F05D 2240/304
See application file for complete search history.

(56) References Cited

U.S. PATENT DOCUMENTS

2015/0176597 A1 6/2015 Tadokoro et al.
2020/0072236 A1* 3/2020 Jensen .................... F24F 7/065
2020/0240431 A1* 7/2020 Bushnell ................ F01D 5/141

FOREIGN PATENT DOCUMENTS

EP 3 085 966 A1 10/2016
JP 52-11203 U 1/1977
(Continued)

OTHER PUBLICATIONS

International Search Report of corresponding PCT Application No. PCT/JP2022/009150 dated May 24, 2022.
(Continued)

*Primary Examiner* — Aaron R Eastman
(74) *Attorney, Agent, or Firm* — Global IP Counselors, LLP

(57) ABSTRACT

A propeller fan includes a blade configured to rotate around a predetermined rotation axis, and a ring connected to a blade end of the blade. The blade includes a curved portion on a side on which the blade end is located. The curved portion has, in a rotational radial direction of the blade, a cross-sectional shape projecting in a convex manner toward a side on which a pressure surface is located. In the curved portion, when a height from a position of a blade root on a camber line in a direction along the predetermined rotation axis is an axial-direction height and a position at which the axial-direction height becomes maximum in the rotational radial direction is a maximum curve position, the axial-direction height at the maximum curve position is maximum on a side on which a trailing edge of the blade is located.

17 Claims, 14 Drawing Sheets

(56) References Cited

FOREIGN PATENT DOCUMENTS

| | | | |
|---|---|---|---|
| JP | 2012-233420 | A | 11/2012 |
| JP | 2021-4608 | A | 1/2021 |
| WO | 2014/024654 | A1 | 2/2014 |
| WO | 2015092924 | A1 | 6/2015 |

OTHER PUBLICATIONS

International Preliminary Report of corresponding PCT Application No. PCT/JP2022/009150 dated Sep. 21, 2023.

Partial Search Report of corresponding EP Application No. 22 76 6992.6 dated Jul. 17, 2024.

* cited by examiner

PROPELLER FAN AND REFRIGERATION APPARATUS

CROSS-REFERENCE TO RELATED APPLICATIONS

This is a continuation of International Application No. PCT/JP2022/009150 filed on Mar. 3, 2022, which claims priority to Japanese Patent Application No. 2021-040365, filed on Mar. 12, 2021. The entire disclosures of these applications are incorporated by reference herein.

BACKGROUND

Technical Field

The present invention relates to a propeller fan and a refrigeration apparatus.

Background Art

In refrigeration apparatuses or the like of the related art, propeller fans have been used in air-sending devices that are configured to generate an air flow. As a propeller fan, there is known a ring-equipped propeller fan that includes a ring provided so as to surround a plurality of blades (see, for example, Japanese Unexamined Patent Application Publication No. 2021-4608). In the ring-equipped propeller fan, the ring is connected to a blade end of each of the blades, and each of the blades and the ring rotate together.

SUMMARY

A first aspect of the present disclosure is directed to a propeller fan including a blade configured to rotate around a predetermined rotation axis, and a ring connected to a blade end of the blade. The blade includes a curved portion on a side on which the blade end is located. The curved portion has, in a rotational radial direction of the blade, a cross-sectional shape projecting in a convex manner toward a side on which a pressure surface is located. In the curved portion, when a height from a position of a blade root on a camber line in a direction along the predetermined rotation axis is an axial-direction height and a position at which the axial-direction height becomes maximum in the rotational radial direction is a maximum curve position, the axial-direction height at the maximum curve position is maximum on a side on which a trailing edge of the blade is located.

DETAILED DESCRIPTION OF EMBODIMENT(S)

An exemplary embodiment will be described below with reference to the drawings.

Figure 1:
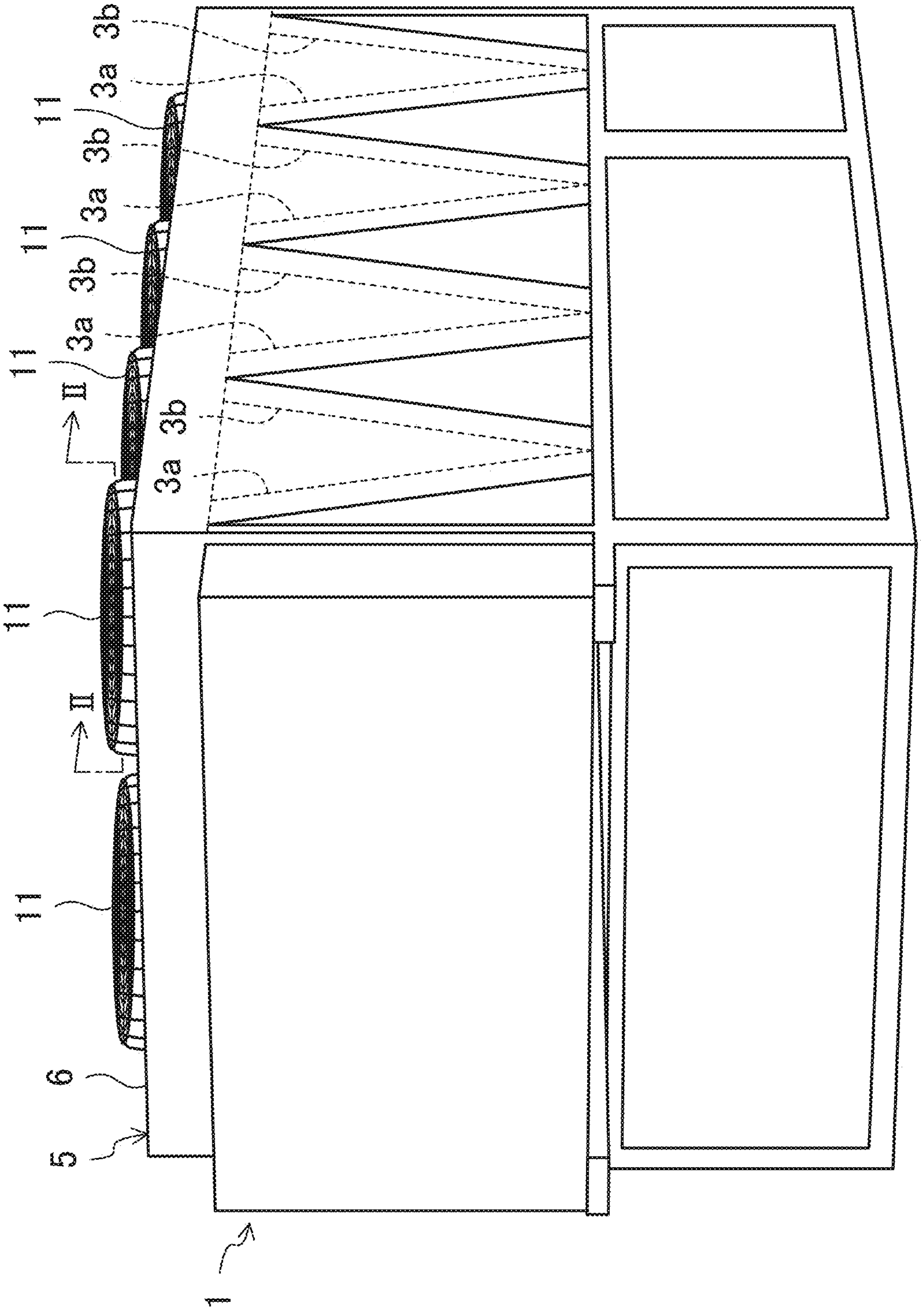
FIG. 1 is a perspective view illustrating an example of a schematic configuration of a chiller device of an embodiment.

A propeller fan (10) according to the present embodiment is configured to be used in an air-sending device (5). The air-sending device (5) is installed in a chiller device (1) such as that illustrated in FIG. 1. The chiller device (1) is an example of a refrigeration apparatus. The chiller device (1) includes four pairs of heat exchangers (3*a*, 3*b*). These four pairs of heat exchangers (3*a*, 3*b*) are arranged in a row in the horizontal direction. Each pair of heat exchangers (3*a*, 3*b*) are arranged such that the distance between the heat exchangers (3*a*) and the heat exchanger (3*b*) increases toward the upper side, forming a V shape when viewed from the side.

The air-sending device (5) is disposed above the pairs of heat exchangers (3*a*, 3*b*). The air-sending device (5)

includes an upper-surface panel (6), the propeller fans (10), a fan motor (not illustrated), and air-sending grilles (11).

Figure 2:
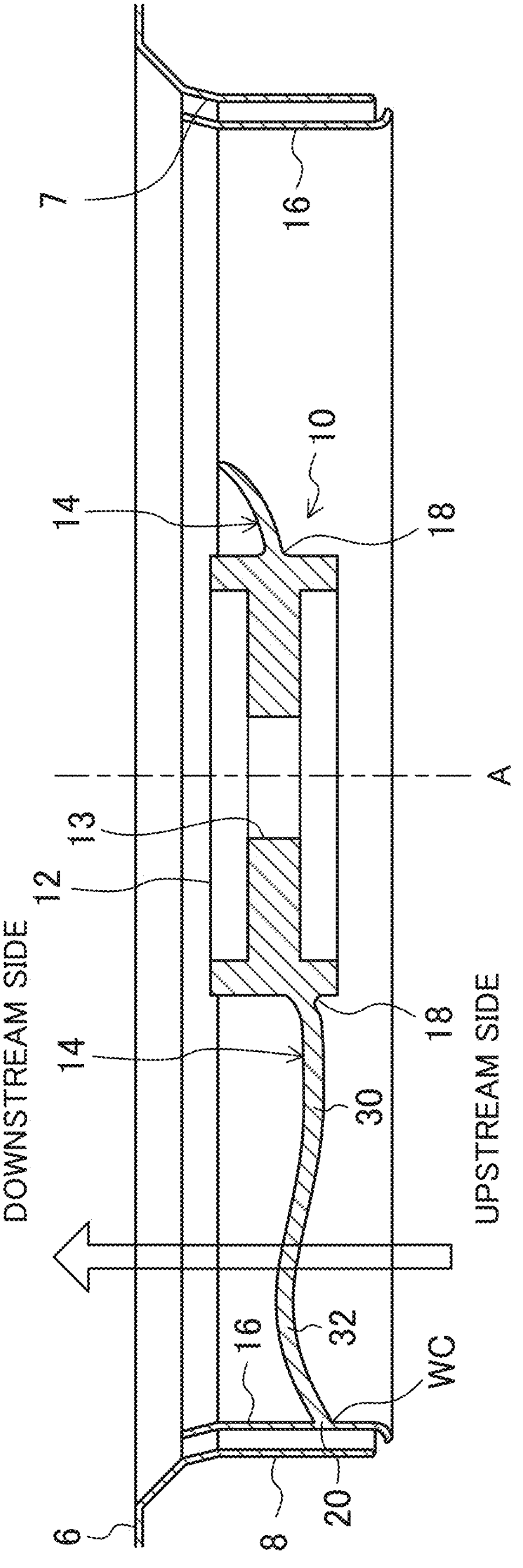
FIG. 2 is a cross-sectional view illustrating, as an example, a principal portion of the chiller device taken along line II-II of FIG. 1.

The upper-surface panel (6) covers the four pairs of heat exchangers (3*a*, 3*b*) from above. The upper-surface panel (6) has a plurality of air-sending ports (7) one of which is illustrated in FIG. 2. The plurality of air-sending ports (7) are arranged in four columns in the arrangement direction of the heat exchangers (3*a*, 3*b*) and two rows in a direction perpendicular to the arrangement direction of the heat exchangers (3*a*, 3*b*). Each pair of the air-sending ports (7) that are arranged in the direction perpendicular to the arrangement direction of the heat exchangers (3*a*, 3*b*) are located above a corresponding one pair of heat exchangers (3*a*, 3*b*). Each of the air-sending ports (7) is formed of a cylindrical bell mouth (8) that is integrally arranged with the upper-surface panel (6).

Each of the bell mouths (8) extends downward from a circumferential edge of an opening of the corresponding air-sending port (7) in the upper-surface panel (6). Each of the propeller fans (10) is disposed in one of the bell mouths (8) in such a manner that a rotation axis (A) of the propeller fan (10) extends in the vertical direction. Each of the propeller fans (10) rotates so as to supply air in an upward direction as a result of being driven by the fan motor. In each of the propeller fans (10) of the present embodiment, the lower side corresponds to an upstream side, and the upper side corresponds to a downstream side. Each of the air-sending grilles (11) is disposed downstream from one of the propeller fan (10) in the upper-surface panel (6).

Configuration of Propeller Fan

Figure 3:
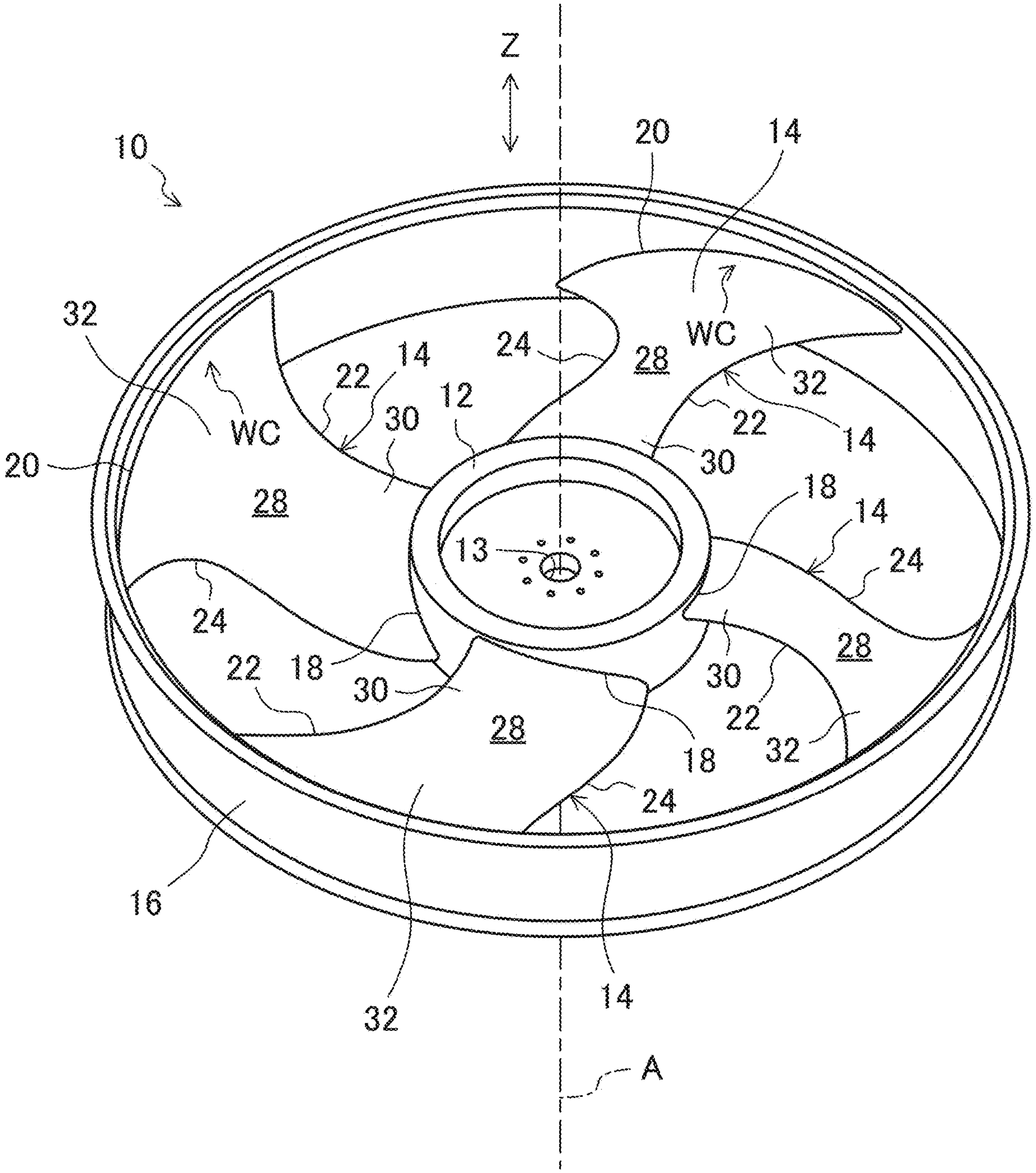
FIG. 3 is a perspective view illustrating, as an example, a propeller fan of the embodiment.
Figure 4:
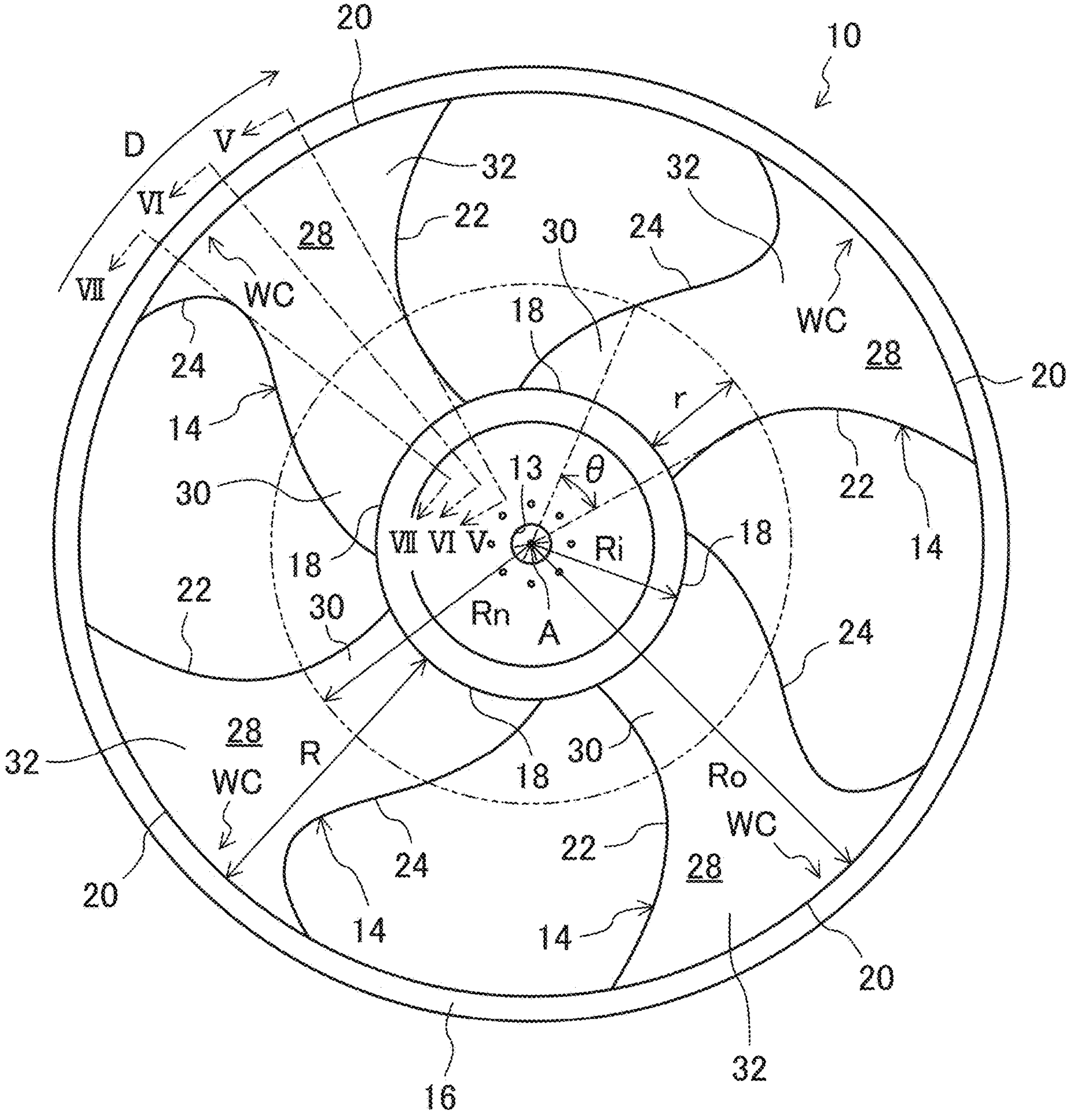
FIG. 4 is a rear view illustrating, as an example, the propeller fan of the embodiment.

The propeller fan (10) is an axial fan made of a synthetic resin. The propeller fan (10) is the propeller fan (10) provided with the ring (16). As illustrated in FIG. 3 and FIG. 4, the propeller fan (10) includes a single hub (12), four blades (14), and the single ring (16). The single hub (12), the four blades (14), and the single ring (16) are integrally formed with one another. The propeller fan (10) is formed by, for example, injection molding. Note that the propeller fan (10) may be made of a metal.

The hub (12) is formed in a cylindrical shape. The hub (12) is a rotary shaft portion of the propeller fan (10) and is located at the center of the propeller fan (10). A center portion of the hub (12) has a shaft hole (13). The fan motor, which is not illustrated, is attached to the hub (12) by passing a drive shaft of the fan motor through the shaft hole (13). When the fan motor is driven, the hub (12) rotates around the rotation axis (A). The center axis of the hub (12) coincides with the rotation axis (A) of the propeller fan (10).

The four blades (14) are arranged at constant angular intervals in a circumferential direction of the hub (12). Each of the blades (14) extends outward from an outer peripheral surface of the hub (12) in a rotational radial direction. The four blades (14) radially expands from the hub (12) toward the outside of the propeller fan (10) in the rotational radial direction. Adjacent ones of the blades (14) do not overlap each other when viewed from the front or when viewed from the rear. Each of the blades (14) is formed in a plate-like shape that is smoothly curved along the rotational radial direction and a rotation direction (D).

The blades (14) have the same shape. In each of the blades (14), an end closer to the center of the propeller fan (10) in a radial direction of the propeller fan (10), that is, an inner end in a direction (the rotational radial direction) perpendicular to the rotation axis (A) is a blade root (18). In each of the blades (14), an end closer to the outer periphery of the propeller fan (10) in the radial direction of the propeller fan (10), that is, an outer end in the direction (the rotational radial direction) perpendicular to the rotation axis (A) is a blade end (20). The blade root (18) and the blade end (20) of each of the blades (14) extend along the rotation direction (D) of the propeller fan (10).

The blade root (18) of each of the blades (14) is connected to the hub (12). In each of the blades (14), a distance Ri from the rotation axis (A) of the propeller fan (10) to the blade root (18) is substantially constant over the entire length of the blade root (18). The blade end (20) of each of the blades (14) is connected to the ring (16). In each of the blades (14), a distance Ro from the rotation axis (A) of the propeller fan (10) to the blade end (20) is substantially constant over the entire length of the blade end (20).

In each of the blades (14), the length of the blade end (20) is larger than the length of the blade root (18). In the rotation direction (D) of the propeller fan (10), a leading end of the blade end (20) is located forward of a leading end of the blade root (18). In the rotation direction (D) of the propeller fan (10), a trailing end of the blade end (20) is located rearward of a trailing end of the blade root (18). In the rotation direction (D), a leading edge of each of the blades (14) is a leading edge (22). In the rotation direction (D), a trailing edge of each of the blades (14) is a trailing edge (24).

The leading edge (22) and the trailing edge (24) of each of the blades (14) extend from the hub (12) to the ring (16). The leading edge (22) of each of the blades (14) is curved in such a manner as to be recessed toward the trailing side in the rotation direction (D) of the blade (14). The trailing edge (24) of each of the blades (14) is curved in such a manner as to be recessed toward the leading side in the rotation direction (D) of the blade (14). In each of the blades (14), a portion of the leading edge (22) and a portion of the trailing edge (24) that are located on the blade root (18) side extend approximately parallel to each other. In each of the blades (14), a portion of the leading edge (22) and a portion of the trailing edge (24) that are located on the blade end (20) side extend toward the blade end (20) such that the distance therebetween increases.

Each of the blades (14) is inclined so as to cross a plane that is perpendicular to the rotation axis (A) of the propeller fan (10). The leading edge (22) of each of the blades (14) is positioned near one end (the end facing upward in FIG. 3) of the hub (12). The trailing edge (24) of each of the blades (14) is positioned near the other end (the end facing downward in FIG. 3) of the hub (12). In each of the blades (14), a surface facing forward in the rotation direction (D) (the surface facing downward in FIG. 3) is a pressure surface (26), and a surface facing rearward in the rotation direction (D) (the surface facing upward in FIG. 3) is a suction surface (28).

The ring (16) is provided so as to surround the plurality of blades (14). The ring (16) is formed in a ring-like shape. The outer peripheral surface of the ring (16) faces the inner peripheral surface of the corresponding bell mouth (8) (see FIG. 2). The inner peripheral surface of the ring (16) is connected to the blade ends (20) of the four blades (14). In other words, the blade ends (20) of the four blades (14) are connected to one another by the ring (16). When the propeller fan (10) is viewed from the side, the ring (16) covers the entirety of each of the blades (14) from the leading edge (22) to the trailing edge (24). The opposite end portions of the ring (16) are bent so as to be curved toward the outer periphery side of the propeller fan (10).

In the propeller fan (10), air flows from a rear surface (a suction side, that is, the lower side) toward a front surface (an air-sending side, that is, the upper side) along with rotation of the four blades (14). Such rotation of the propeller fan (10) enables the air-sending device (5) to supply the air. When the propeller fan (10) rotates around the rotation axis (A), the pressure surfaces (26) push out the air. In this case, the pressure on the side on which the pressure surfaces (26) of the blades (14) are located increases in order to push out the air while the pressure on the side on which the suction surfaces (28) of the blades (14) are located decreases.

When the propeller fan (10) rotates, the air flowing along the pressure surfaces (26) of the blades (14) reaches the trailing edges (24) and the blade ends (20) of the blades (14) and moves away from the pressure surfaces (26), and then, an airflow is generated such that the air is drawn toward the suction surfaces (28) from the pressure surfaces (26) and becomes a vortex. A vortex that is generated on the side on which the blade ends (20) of the blades (14) are located is called a blade-end vortex. A vortex that is generated on the side on which the trailing edges (24) of the blades (14) are located is called a trailing vortex. Both the blade-end vortex and the trailing vortex cause energy loss, which in turn reduces an air-sending performance.

Since the propeller fan (10) includes the ring (16), the air pushed out by the propeller fan (10) is less likely to flow around the blade ends (20) from the side on which the pressure surfaces (26) of the blades (14) are located toward the side on which the suction surfaces (28) of the blades (14) are located. This suppresses generation of a blade-end vortex. However, in the propeller fan (10) including the ring (16), corners (hereinafter referred to as "blade-end corners") (WC) are formed at portions where the blades (14) are connected to the ring (16) on the suction surfaces (28) side, and a dead water area (DA) where the airflow is stagnant due to the influence of a boundary layer is generated at each of the blade-end corners (WC). In the propeller fan (10) of the present embodiment, the shape of each of the blades (14) is designed so as to suppress generation of the dead water area (DA).

Shape of Blade

Figure 5:
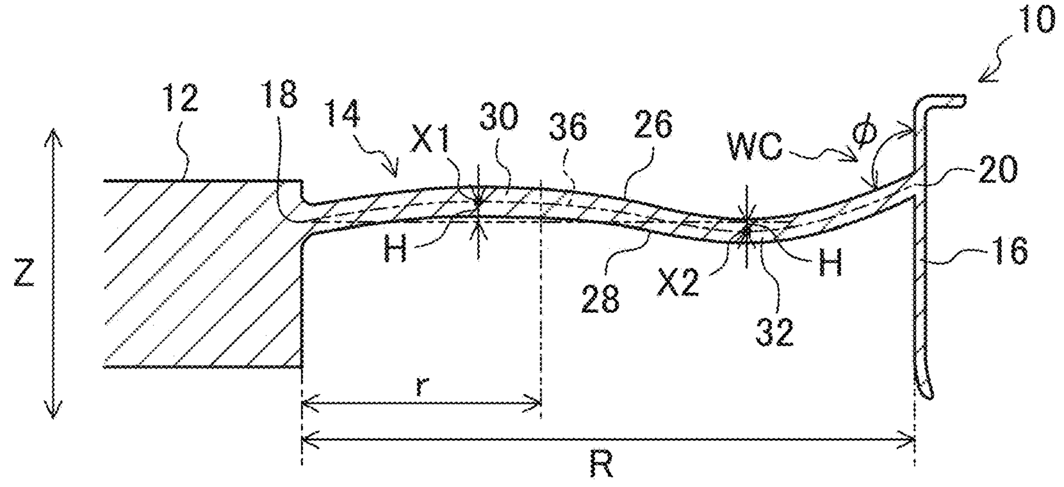
FIG. 5 is a cross-sectional view illustrating, as an example, a cross section of a blade of the propeller fan taken along line V-V of FIG. 4.
Figure 6:
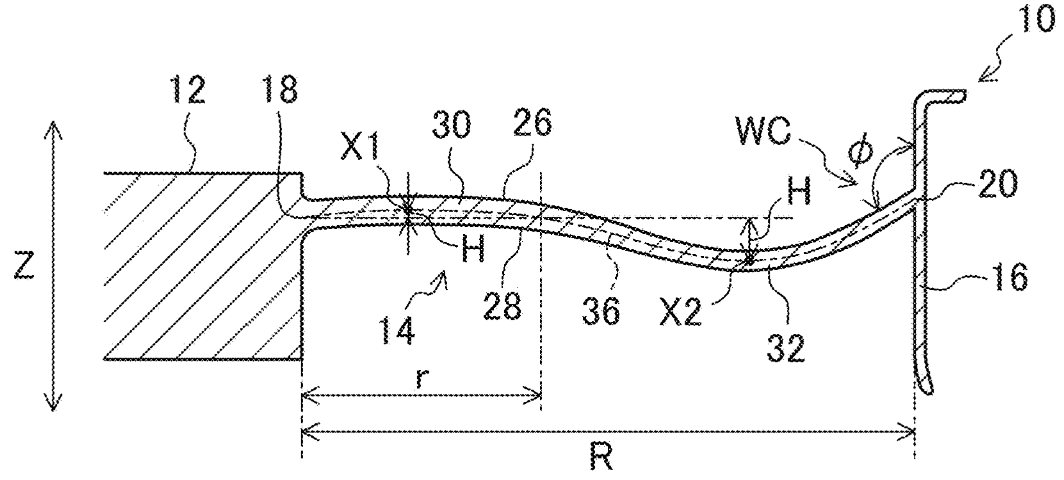
FIG. 6 is a cross-sectional view illustrating, as an example, a cross section of the blade of the propeller fan taken along line VI-VI of FIG. 4.
Figure 7:
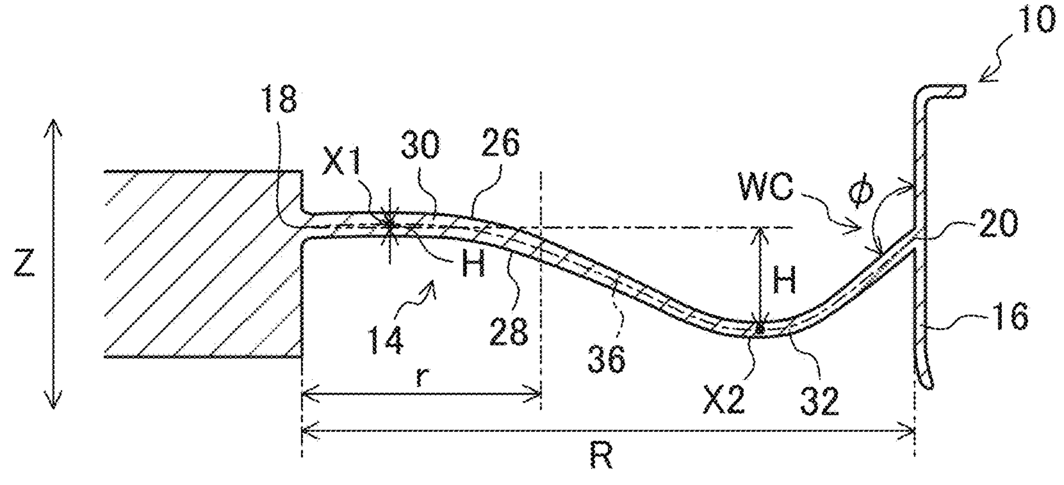
FIG. 7 is a cross-sectional view illustrating, as an example, a cross section of the blade of the propeller fan taken along line VII-VII of FIG. 4.

As illustrated in FIG. 5 to FIG. 7, each of the blades (14) includes a first curved portion (30) and a second curved portion (32). The first curved portion (30) is provided on the side on which the blade root (18) of the blade (14) is located, that is, the inner side in the rotational radial direction. In the rotational radial direction of the blade (14), the first curved portion (30) has a cross-sectional shape projecting, in a convex manner, toward the side on which the suction surface (28) is located. The second curved portion (32) is provided on the side on which the blade end (20) of the blade (14) is located, that is, the outer side in the rotational radial direction. In the rotational radial direction of the blade (14), the second curved portion (32) has a cross-sectional shape projecting, in a convex manner, toward the side on which the pressure surface (26) is located.

Each of the first curved portions (30) forms 70% or more, and preferably 80% or more, of a portion of the corresponding blade (14), the portion being located further toward the inner side than an intermediate position in the blade (14) in the rotational radial direction. Each of the second curved portions (32) forms 70% or more, and preferably 80% or more, of a portion of the corresponding blade (14), the portion being located further toward the outer side than the intermediate position in the blade (14) in the rotational radial direction. In the present embodiment, the inner half portions of the blades (14) in the rotational radial direction are formed of the first curved portions (30). The outer half portions of the blades (14) in the rotational radial direction are formed of the second curved portions (32).

Figure 8:
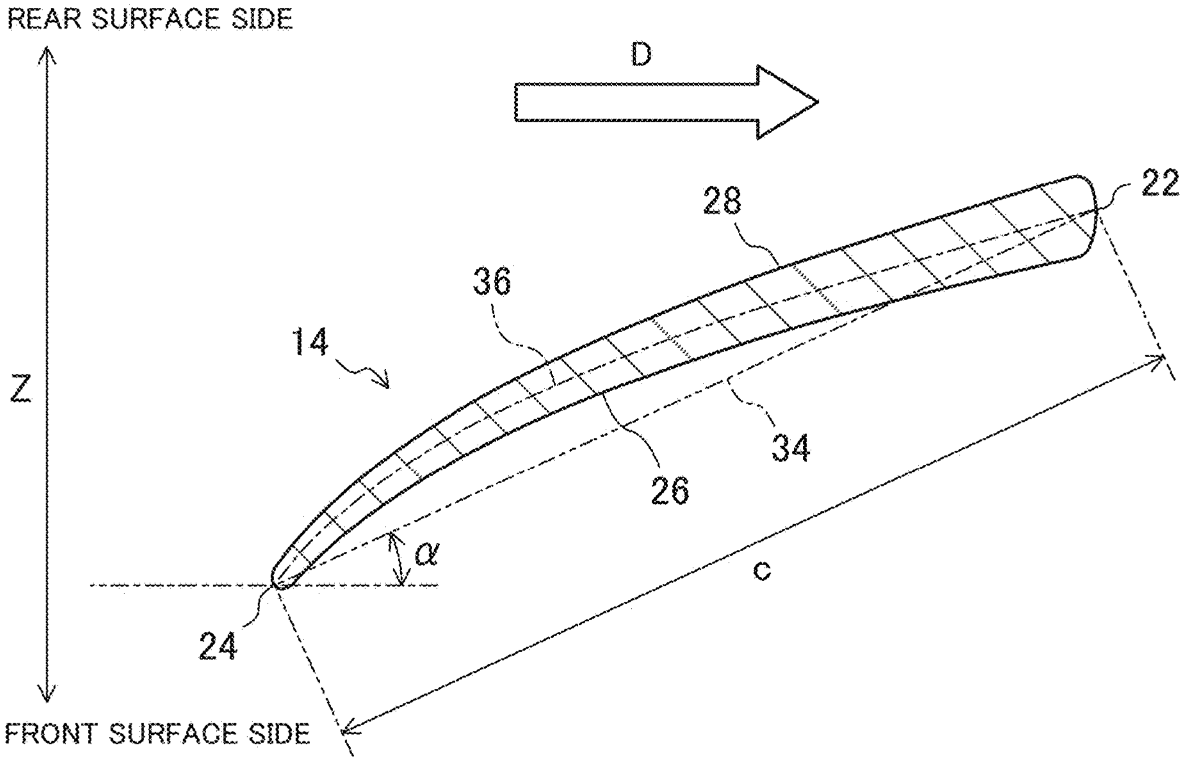
FIG. 8 is a cross-sectional view illustrating, as an example, a cross section of one of the blades in a circumferential direction of the propeller fan of the embodiment.

The blade cross-section illustrated in FIG. 8 is obtained by developing a cross section of one of the blades (14) that is located at a distance Rn from the rotation axis (A) of the propeller fan (10), that is, an arc-shaped cross section around the rotation axis (A), into a plane. As illustrated in FIG. 8, each of the blades (14) is curved, in a convex manner, toward the side on which the suction surface (28) is located. In the blade cross-section illustrated in FIG. 8, the line segment connecting the leading edge (22) and the trailing edge (24) of the blade (14) is a blade chord (34).

The angle formed by the blade chord (34) and a plane that is perpendicular to the rotation axis (A) of the propeller fan (10) is an attachment angle ($\alpha$). In each of the blades (14), the attachment angle ($\alpha$) varies in accordance with a radius ratio (r/R). When the distance from the blade root (18) to the blade end (20) of the blade (14) in a blade cross-section (in the rotational radial direction of the blade (10)) passing through the rotation axis (A) is denoted by R (Ro-Ri) and the distance from the blade root (18) of the blade (14) to an arbitrary position in the blade cross-section is denoted by r (Rn-Ri), the radius ratio (r/R) is the ratio (r/R) of the distance r to the distance R. The radius ratio (r/R) indicates a position from the blade root (18) in the rotational radial direction of the blade (14).

The length of the blade chord (34) is a blade chord length (c). The blade chord length (c) is a value ($c=Rn\theta/\cos\alpha$) obtained by dividing a length ($Rn\theta$) of an arc having a radius Rn and a central angle $\theta$ by a cosine ($\cos\alpha$) with respect to the attachment angle ($\alpha$). Note that the central angle $\theta$ is the central angle of the blade (14) that is located at the distance Rn from the rotation axis (A) of the propeller fan (10) (see FIG. 4) and is expressed in units of radian.

Blade Chord Length

As illustrated in FIG. 8, in each of the blades (14), the blade chord length (c) varies in accordance with the radius ratio (r/R). The blade chord length (c) is approximately constant in the first curved portion (30). Here, when the blade chord length (c) is "approximately constant", the variation range of the blade chord length (c) is within ±10% of the blade chord length (c) at the blade root (18). It is preferable that the variation range of the blade chord length (c) in the first curved portion (30) be within a range of ±5% of the blade chord length (c) at the blade root (18). The blade chord length (c) in the second curved portion (32) gradually increases toward the blade end (20). The variation range of the blade chord length (c) in the second curved portion (32) per unit length in the rotational radial direction increases toward the blade end (20). The blade chord length (c) of each of the blades (14) does not become maximum at an intermediate portion of the second curved portion (32) and becomes maximum at the blade end (20).

Height at Maximum Curve Position, Axial-Direction Height

In the blade cross-sections illustrated in FIG. 5 to FIG. 7, the line extending at the midpoint between the pressure surface (26) and the suction surface (28) is a camber line (36). In each of the blades (14), a height from the position of the blade root (18) on the camber line (36) in a direction along the rotation axis (A) is an axial-direction height (H). The axial-direction height (H) in the first curved portion (30) of each of the blades (14) is the height on the pressure surface (26) side. The axial-direction height (H) in the second curved portion (32) of each of the blades (14) is the height on the suction surface (28) side.

Figure 9:
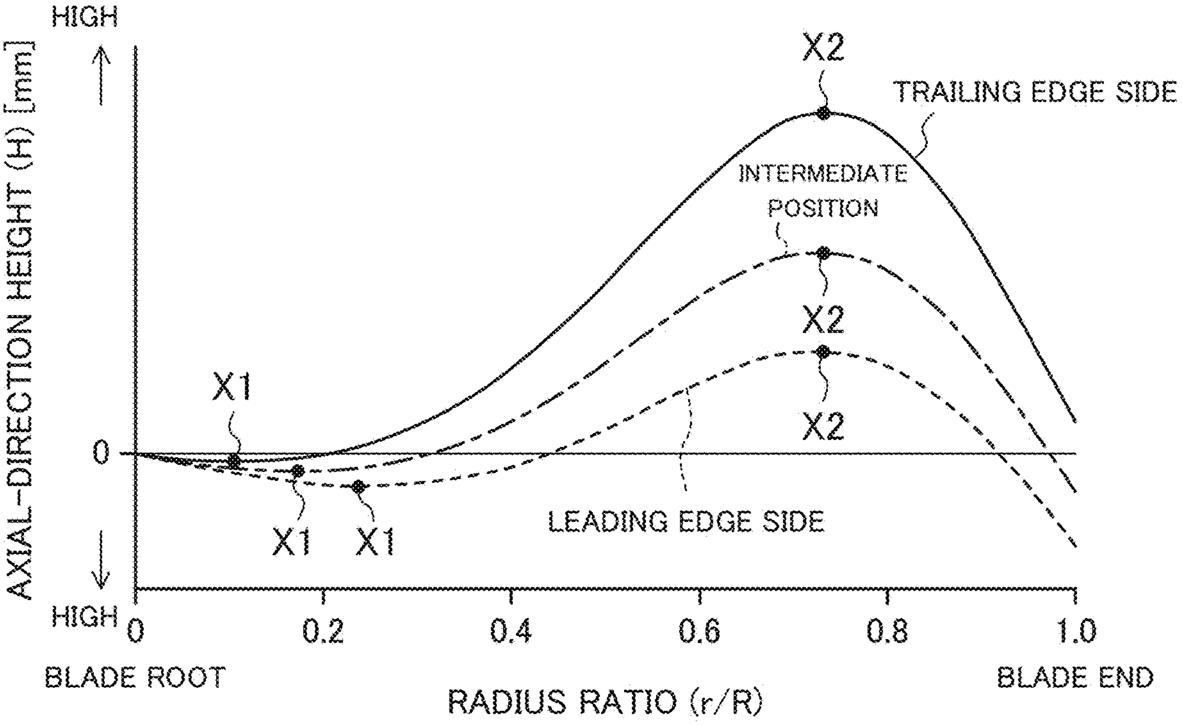
FIG. 9 is a graph illustrating, as an example, a relationship between a radius ratio and an axial-direction height in the propeller fan of the embodiment.

In the graph illustrated in FIG. 9, a profile of the axial-direction height (H) in the blade cross-section illustrated in FIG. 5 is indicated by a dashed line. A profile of the axial-direction height (H) in the blade cross-section illustrated in FIG. 6 is indicated by a one-dot chain line. A profile of the axial-direction height (H) in the blade cross-section illustrated in FIG. 7 is indicated by a solid line. As illustrated in FIG. 5 to FIG. 8, the axial-direction height (H) in each of the blades (14) smoothly changes over the entire length in the rotational radial direction in any cross-sectional shape from the blade root (18) to the blade end (20).

In the first curved portion (30), the position where the axial-direction height (H) becomes maximum in the rotational radial direction is a first maximum curve position (X1). In each of the blades (14) of the propeller fan (10) of the present embodiment, the first maximum curve position (X1) becomes closer to the blade root (18) in a direction from the leading edge (22) to the trailing edge (24). In addition, the axial-direction height (H) at the first maximum curve position (X1) becomes maximum on the leading edge (22) side of the blade (14). More specifically, the axial-direction height (H) at the first maximum curve position (X1) decreases in a direction from the leading edge (22) of the blade (14) to the trailing edge (24) of the blade (14) and becomes minimum at the trailing edge (24). The axial-direction height (H) at the first maximum curve position (X1) may be approximately constant across the full width of the first curved portion (30) in a direction along the blade chord (34).

Figure 10:
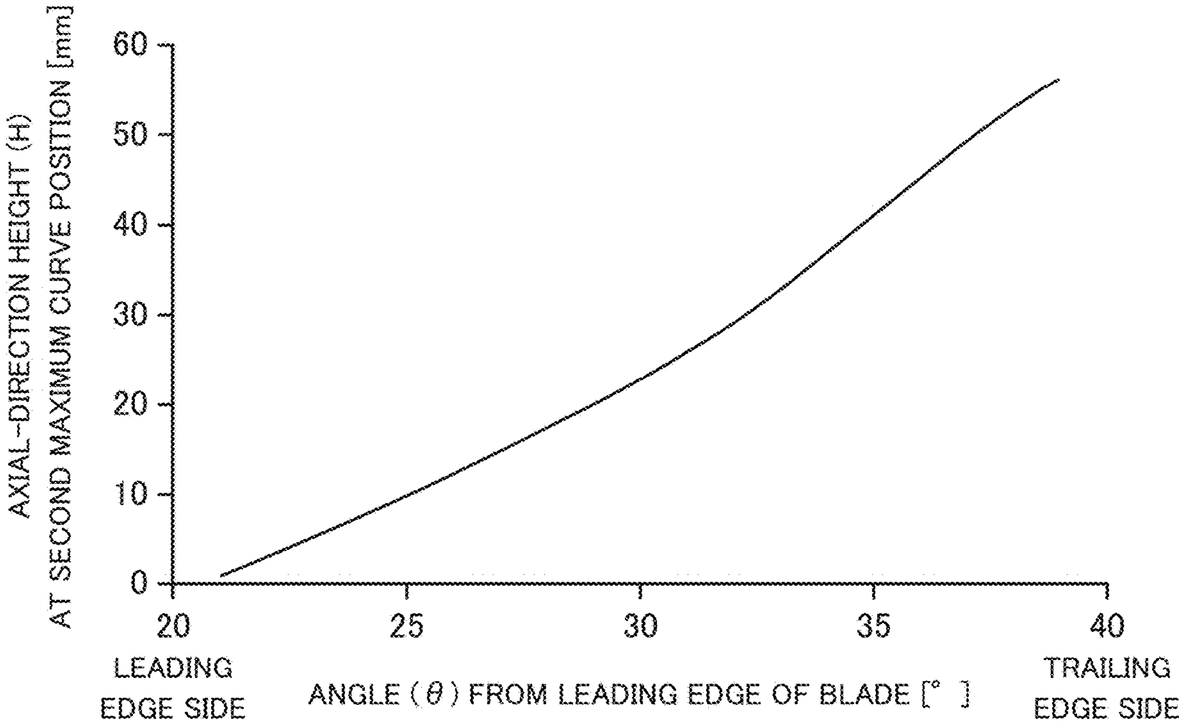
FIG. 10 is a graph illustrating, as an example, a relationship between an angle from a leading edge of one of the blades and the axial-direction height at a second maximum warp position in the propeller fan of the embodiment.

In the second curved portion (32), the position where the axial-direction height (H) becomes maximum in the rotational radial direction is a second maximum curve position (X2). In the propeller fan (10) of the present embodiment, when the second maximum curve position (X2) is expressed by the radius ratio (r/R), it is located in a range of $0.6 \leq r/R \leq 0.8$. The second maximum curve position (X2) is approximately constant across the full width of the second curved portion (32) in the direction along the blade chord (34). In addition, the axial-direction height (H) at the second maximum curve position (X2) becomes maximum on the trailing edge (24) side of the blade (14). More specifically, as illustrated in FIG. 10, the axial-direction height (H) at the second maximum curve position (X2) increases in a direction from the leading edge (22) of the blade (14) to the trailing edge (24) of the blade (14) and becomes maximum at the trailing edge (24).

Figure 11:
FIG. 11 is a graph illustrating, as an example, a relationship between an angle from the leading edge of one of the blades about a rotation axis and an angle formed by the blade and a ring at blade-end corner in the propeller fan of the embodiment.

In the rotational radial direction of the blades (14), the blades (14) and the ring (16) form the blade-end corners (WC) on the side on which the suction surfaces (28) of the blades (14) are located. An angle (φ) formed by each of the blades (14) and the ring (16) at the corresponding blade-end corner (WC) (hereinafter referred to as "angle (φ) of the blade-end corner (WC)") varies in accordance with the axial-direction height (H) the second maximum curve position (X2) in the blade (14). In other words, in each of the blades (14), the angle (φ) of the blade-end corner (WC) increases as the axial-direction height (H) at the second maximum curve position (X1) becomes large. The angle (φ) of the blade-end corner (WC) becomes maximum on the trailing edge (24) side of the blade (14). More specifically, as illustrated in FIG. 11, the angle (φ) of the blade-end corner (WC) increases in a direction from the leading edge (22) of the blade (14) to the trailing edge (24) of the blade (14) and becomes maximum at the trailing edge (24). The blade (14) includes a portion where the angle (φ) of the blade-end corner (WC) is 130 degrees or larger on the trailing edge (24) side.

Performance of Propeller Fan

Figure 19:
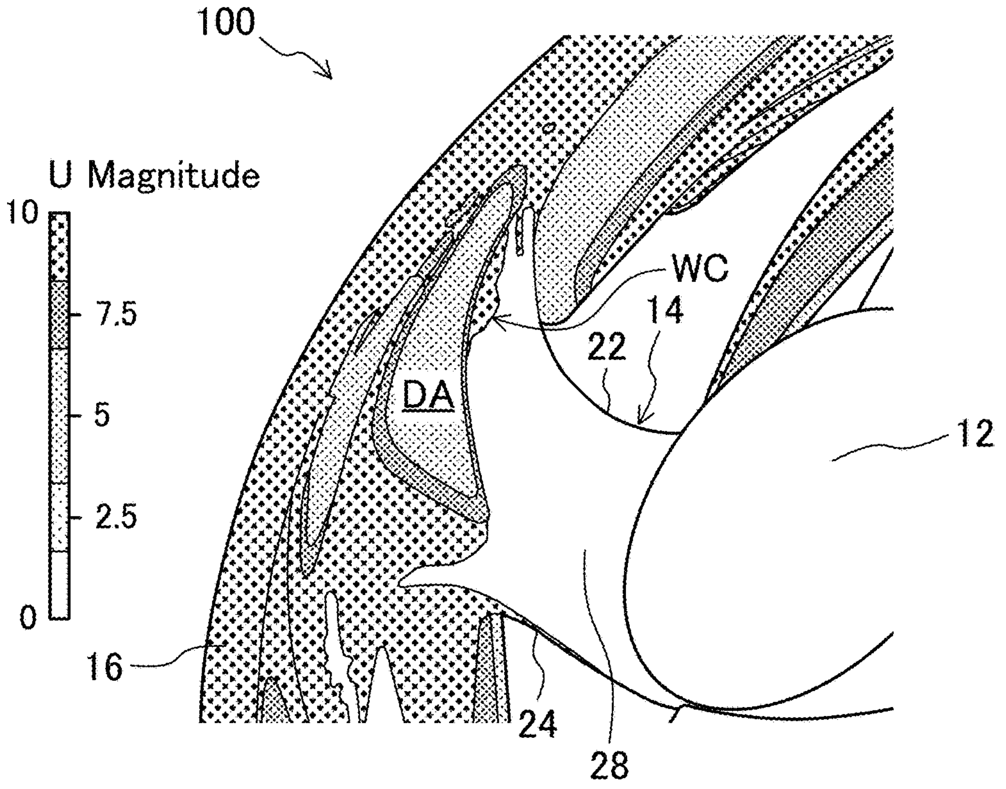
FIG. 19 is a diagram illustrating a result of a fluid simulation conducted on the side on which suction surfaces of blades are located in a propeller fan of a comparative example.
Figure 20:
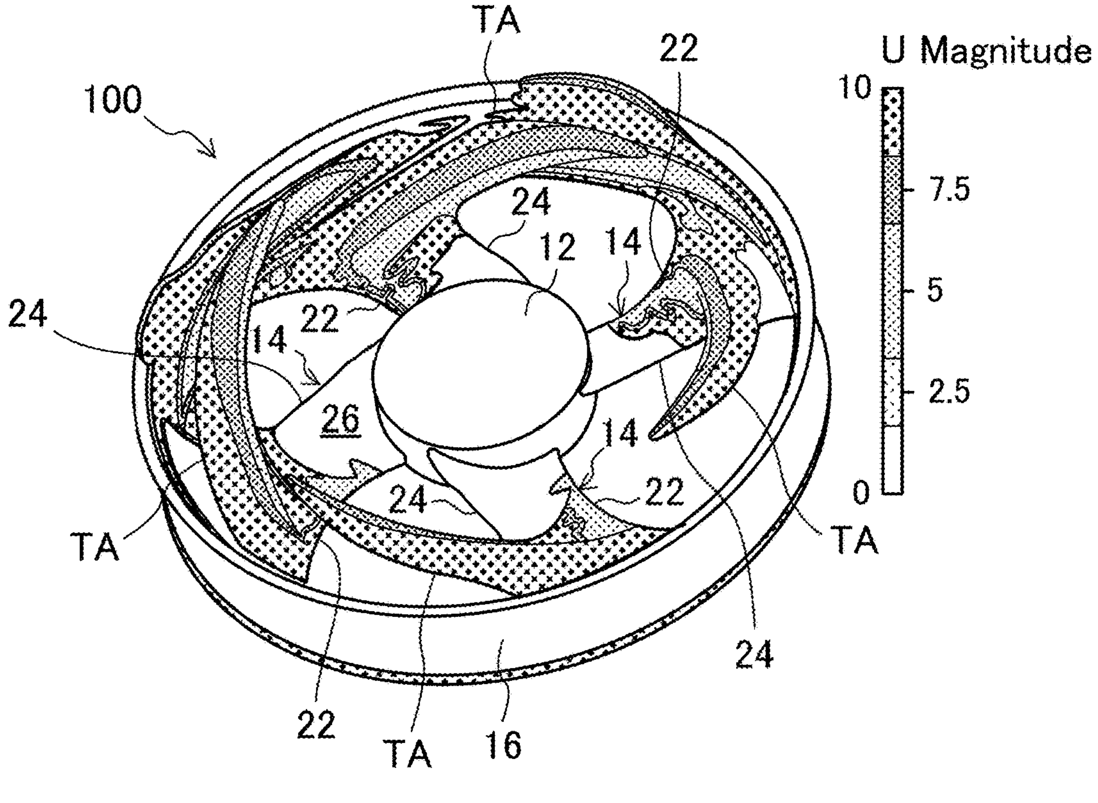
FIG. 20 is a diagram illustrating a result of a fluid simulation conducted on the side on which pressure surfaces of blades are located in the propeller fan of the comparative example.

FIG. 19 and FIG. 20 each illustrate a result of a fluid simulation conducted on a propeller fan (100) of a comparative example with an isosurface of turbulent kinetic energy (magnitude of air velocity) colored in gray scale. The airflow rate in this fluid simulation is 280 $m^3$/min on a large airflow rate side. The propeller fan (100) of the comparative example is a fan in which the cross-sectional shape of each of the blades (14) in the rotational radial direction has no curve. As illustrated in FIG. 19, in each of the blades (14) of the propeller fan (100) of the comparative example, the dead water area (DA), which is the region surrounded by a two-dot chain line, is formed at the blade-end corner (WC) on the suction surface (28) side and is a relatively wide area expanding from the leading edge (22) toward the trailing edge (24), and it is understood that the air velocity at the blade-end corner (WC) is low in a wide area from the leading edge (22) to the trailing edge (24). In addition, as illustrated in FIG. 20, in each of the blades (14) of the propeller fan (100) of the comparative example, a high turbulent kinetic energy area (TA) that is the area surrounded by a two-dot chain line and that starts from the leading edge (22) of the blade (14) on the pressure surface (26) side is relatively large, and it is understood that the energy loss due to a trailing vortex is large.

Figure 12:
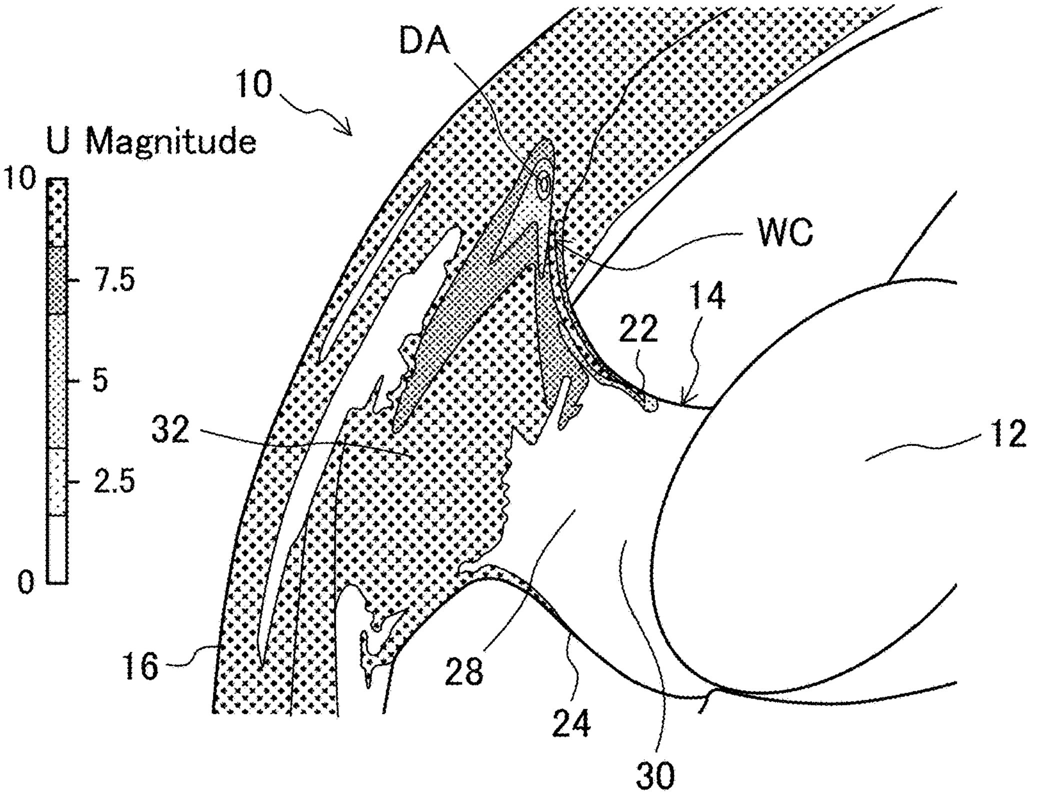
FIG. 12 is a diagram illustrating a result of a fluid simulation conducted on the side on which suction surfaces of the blades are located in the propeller fan of the embodiment.
Figure 13:
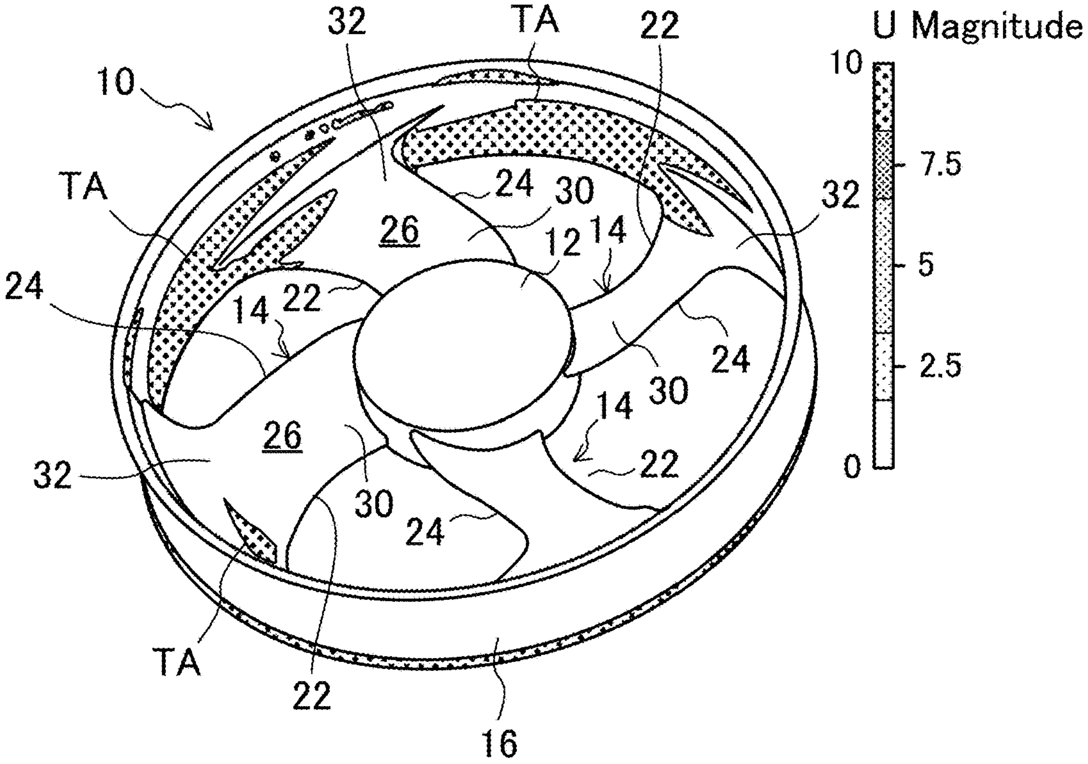
FIG. 13 is a diagram illustrating a result of a fluid simulation conducted on the side on which pressure surfaces of the blades are located in the propeller fan of the embodiment.

FIG. 12 and FIG. 13 each illustrate a result of a fluid simulation conducted on the propeller fan (10) of the present embodiment with an isosurface of turbulent kinetic energy (magnitude of air velocity) colored in gray scale. The airflow rate in this fluid simulation is 280 $m^3$/min on a large airflow rate side. As illustrated in FIG. 12, in each of the blades (14) of the propeller fan (10) of the present embodiment, although the dead water area (DA), which is the region surrounded by a two-dot chain line, is formed at the leading edge (22) side of the blade-end corner (WC) on the suction surface (28) side, the dead water area (DA) is relatively small, and it is understood that the air velocity at the blade-end corner (WC) increases. In addition, as illustrated in FIG. 13, in each of the blades (14) of the propeller fan (10) of the present embodiment, the high turbulent kinetic energy area (TA) that is the area surrounded by a two-dot chain line and that starts from the leading edge (22) of the blade (14) on the pressure surface (26) side is relatively small, and it is understood that the energy loss due to a trailing vortex is small.

Figure 14:
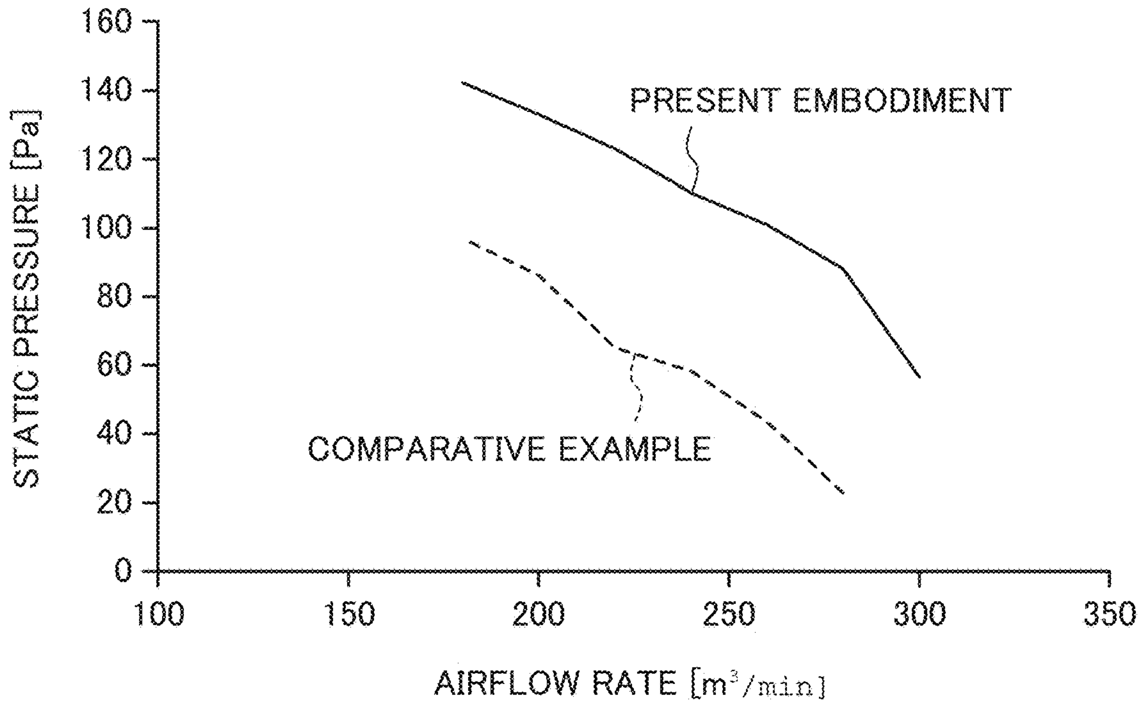
FIG. 14 is a graph illustrating, as an example, a relationship between airflow rate and static pressure in the propeller fan of the embodiment.

In FIG. 14, the solid line indicates the airflow rate-static pressure characteristics (P-Q curve) of an air-sending device that uses the propeller fan (10) of the present embodiment, and the dashed line indicates the airflow rate-static pressure characteristics (P-Q curve) of an air-sending device that uses the propeller fan (100) of the comparative example. As mentioned above, the propeller fan (100) of the comparative example is a fan in which the cross-sectional shape of each of the blades (14) in the rotational radial direction has no curve. As illustrated in FIG. 11, in the entire region of the graph, the static pressure in the air-sending device (5) using the propeller fan (10) of the present embodiment is higher than that in the air-sending device using the propeller fan (100) of the comparative example at the same airflow rate, and the airflow rate in the air-sending device (5) using the propeller fan (10) of the present embodiment is higher than that in the air-sending device using the propeller fan (100) of the comparative example at the same static pressure.

Figure 15:
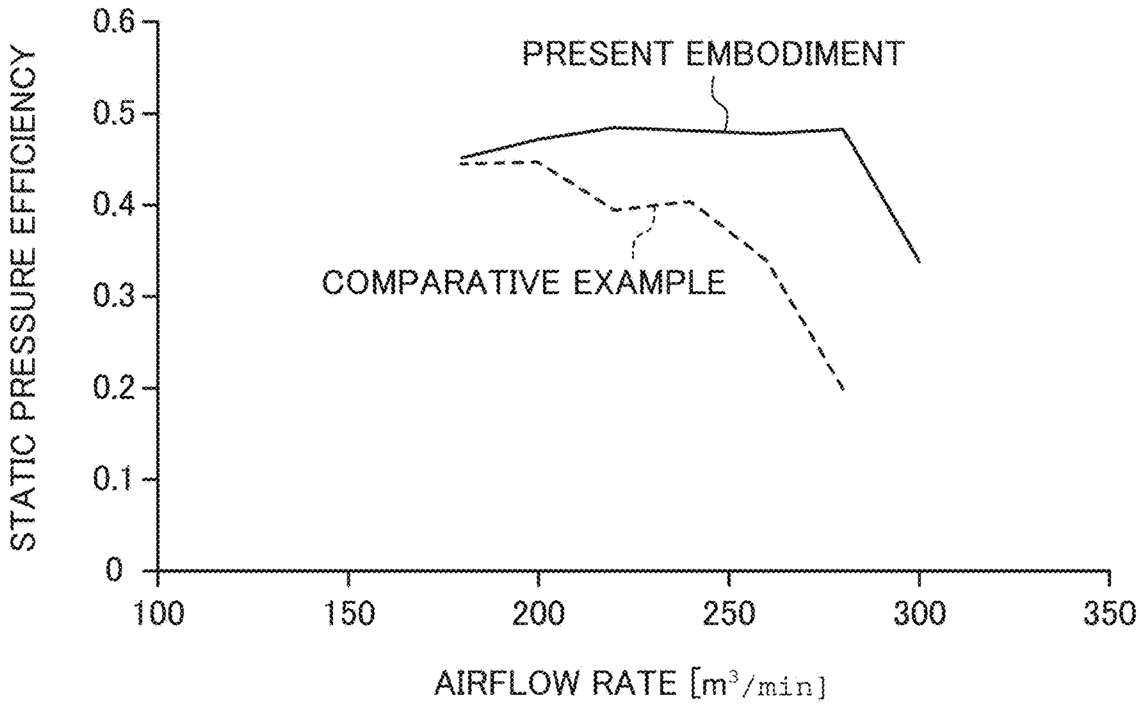
FIG. 15 is a graph illustrating, as an example, a relationship between airflow rate and static pressure efficiency in the propeller fan of the embodiment.

In FIG. 15, the solid line indicates the relationship between airflow rate and static pressure efficiency in the air-sending device using the propeller fan (10) of the present embodiment, and the dashed line indicates the relationship between airflow rate and static pressure efficiency in the air-sending device using the propeller fan (100) of the comparative example. As mentioned above, the propeller fan (100) of the comparative example is a fan in which the cross-sectional shape of each of the blades (14) in the rotational radial direction has no curve. As illustrated in FIG. 12, the static pressure efficiency in the air-sending device using the propeller fan (10) of the present embodiment is higher than that in the air-sending device using the propeller fan (100) of the comparative example at the same airflow rate in the entire region of the graph, particularly on the large airflow rate side.

Features of Embodiment

According to the propeller fan (10) of the present embodiment, in each of the blades (14), the axial-direction height (H) at the second maximum curve position (X2) is maximum on the trailing edge (24) of the blade (14) in the second curved portion (32), which is provided on the side on which the blade end (20) of the corresponding blade (14) is located and whose cross-sectional shape in the rotational radial direction projects, in a convex manner, toward the side on which the pressure surface (26) is located, and thus, the dead water area (DA) that is formed at the blade-end corner (WC) is small. As the dead water area (DA) becomes smaller, the likelihood of a trailing vortex developing decreases, resulting in lower energy of the trailing vortex. As a result, energy loss caused by a trailing vortex colliding with the leading edge (22) of the blade (14) can be suppressed, and the air-sending performance of the propeller fan (10) can be improved.

According to the propeller fan (10) of the present embodiment, the second maximum curve position (X2) in the second curved portion (32) of each of the blades (14) is located in the range of $0.6 \leq r/R \leq 0.8$, and thus, the dead water area (DA) that is formed at each of the blade-end corners (WC) can be appropriately reduced. This is advantageous for suppressing generation of a trailing vortex.

According to the propeller fan (10) of the present embodiment, in each of the blades (14), the axial-direction height (H) at the second maximum curve position (X2) in the second curved portion (32) increases in the direction from the leading edge (22) of the blade (14) to the trailing edge (24) of the blade (14), and thus, the dead water area (DA) that is formed at the blade-end corner (WC) can be reduced in the direction from the leading edge (22) toward the trailing edge (24). This is advantageous for suppressing generation of a trailing vortex.

According to the propeller fan (10) of the present embodiment, in each of the blades (14), the angle (φ) formed by the blade (14) and the ring (16) at the blade-end corner (WC) in the rotational radial direction of the blade (14) becomes maximum on the trailing edge (24) side of the blade (14), and thus, the dead water area (DA) that is formed at the blade-end corner (WC) is reduced. As the dead water area (DA) becomes smaller, the likelihood of a trailing vortex developing decreases, resulting in lower energy of the trailing vortex. As a result, energy loss caused by a trailing vortex colliding with the leading edge (22) of the blade (14) can be suppressed, and the air-sending performance of the propeller fan (10) can be improved.

According to the propeller fan (10) of the present embodiment, in each of the blades (14), the angle (φ) formed by the blade (14) and the ring (16) at the blade-end corner (WC) in the rotational radial direction of the blade (14) increases in the direction from the leading edge (22) of the blade (14) to the trailing edge (24) of the blade (14), and thus, the dead water area (DA) that is formed at the blade-end corner (WC) can be reduced in the direction from the leading edge (22) toward the trailing edge (24). This is advantageous for suppressing generation of a trailing vortex.

According to the propeller fan (10) of the present embodiment, each of the blades (14) includes a portion where the angle (φ) formed by the blade (14) and the ring (16) at the blade-end corner (WC) in the rotational radial direction of the blade (14) is 130 degrees or larger on the trailing edge (24) side, and thus, the dead water area (DA) that is formed at each of the blade-end corners (WC) can be appropriately reduced. This is advantageous for suppressing generation of a trailing vortex.

According to the chiller device (1) of the present embodiment, the propeller fan (10) whose air-sending performance has been improved is provided, and thus, energy saving can be achieved while ensuring the flow rate of the air sent by the propeller fan (10).

OTHER EMBODIMENTS

The above-described embodiment may employ the following configurations.

First Modification

Figure 16:
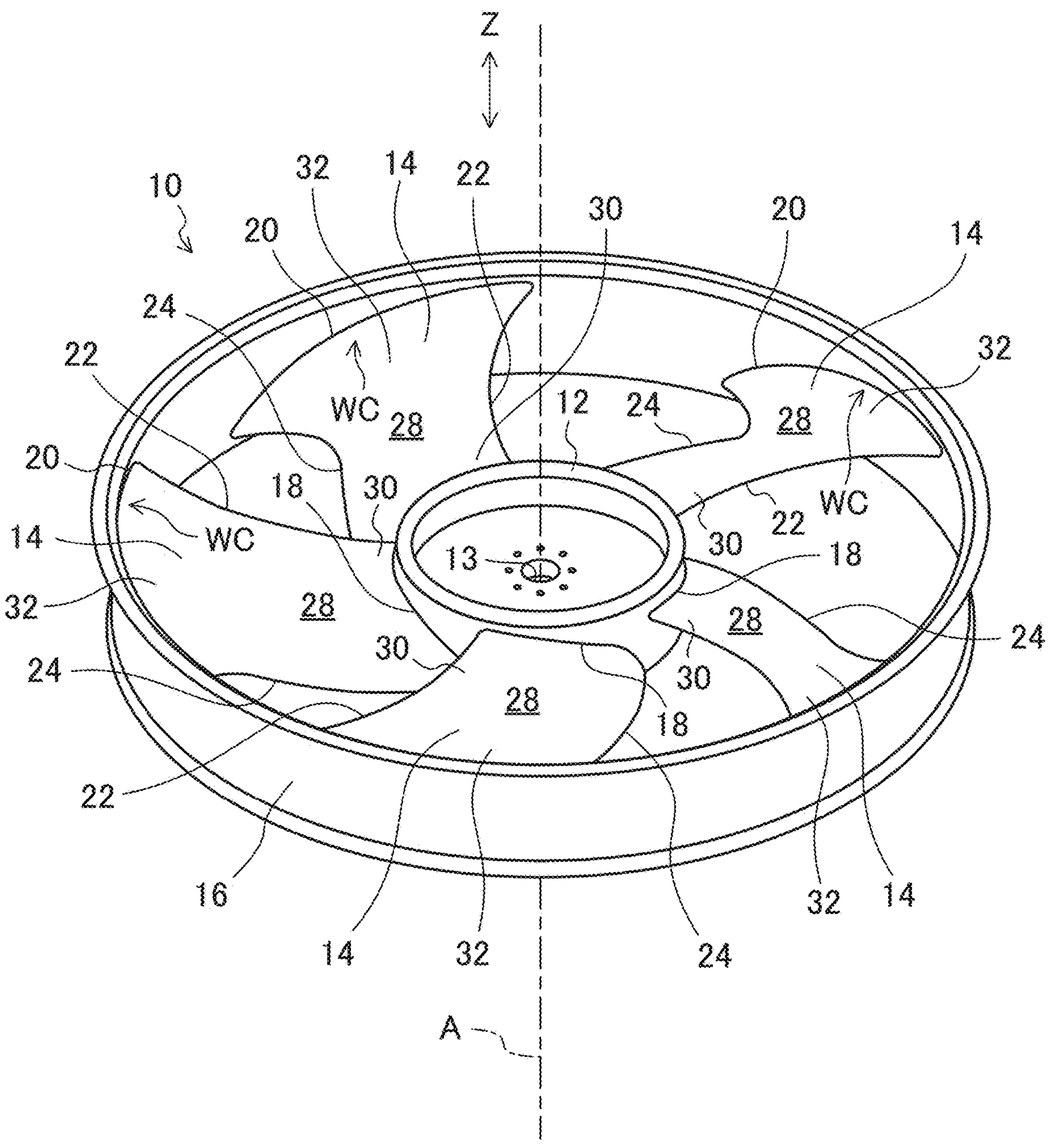
FIG. 16 is a perspective view illustrating a propeller fan of a first modification.

As illustrated in FIG. 16, the number of the blades (14) included in the propeller fan (10) may be five. The number of the blades (14) included in the propeller fan (10) may be three or less or may be six or more. In addition, in the propeller fan (10), adjacent ones of the blades (14) may partially overlap each other when viewed from the front or when viewed from the rear.

Second Modification

Figure 17:
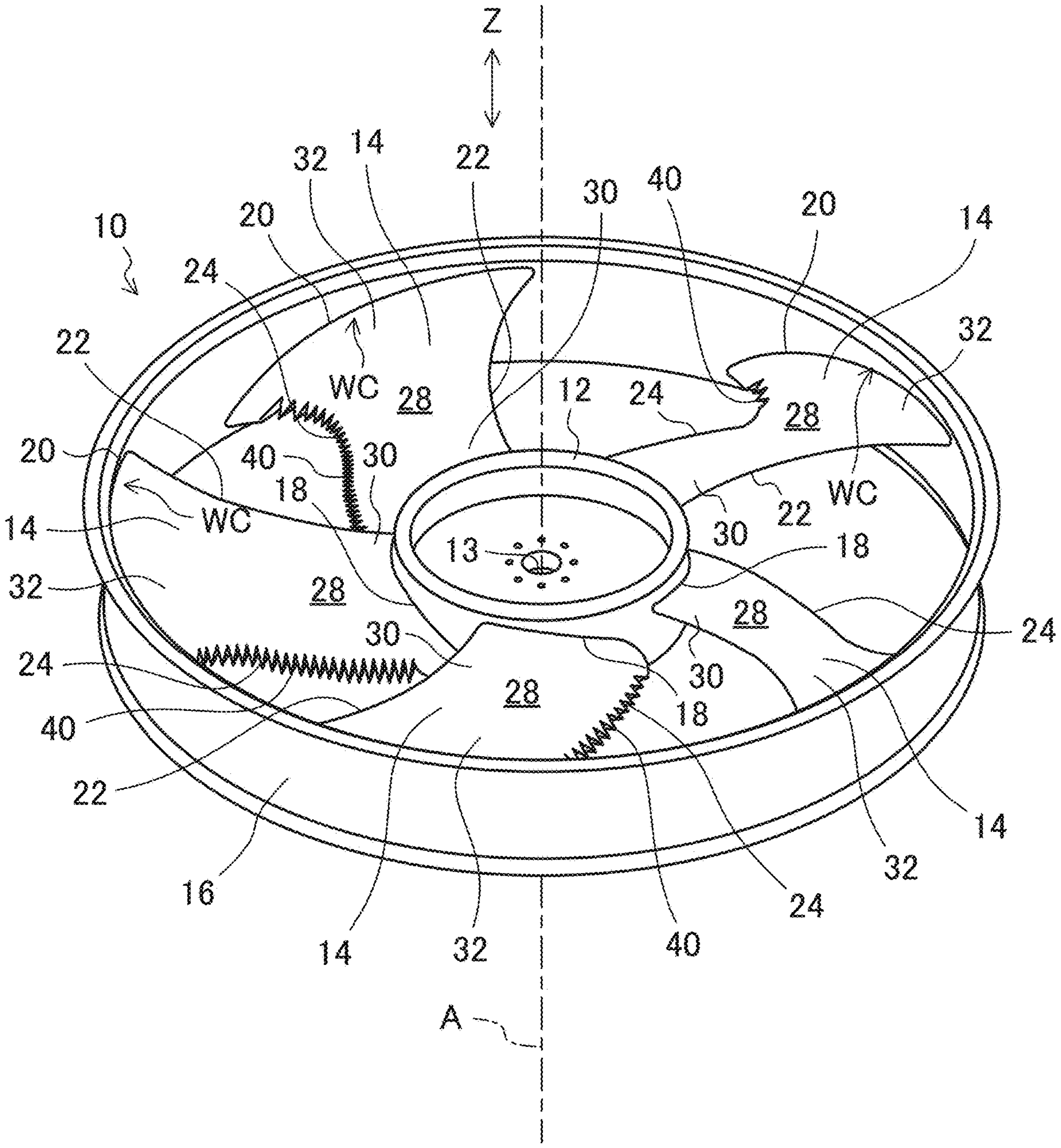
FIG. 17 is a perspective view illustrating a propeller fan of a second modification.

As illustrated in FIG. 17, in the propeller fan (10), a serration (40) may be provided at the trailing edge (24) of each of the blades (14). The serration (40) is formed in, for example, a saw-tooth shape. The serration (40) may be provided over substantially the entire trailing edge (24) of each of the blades (14). The serration (40) may be provided only at a portion, which is, for example, a portion of the trailing edge (24) of each of the blades (14) on the blade end (20) side.

According to the propeller fan (10) of the second modification, since the serration (40) is provided at the trailing edge (24) of each of the blades (14), turbulence of the air flowing on the side on which the suction surfaces (28) of the blades (14) are located is suppressed by the serrations (40). As a result, wind noise that is generated by the blades along with rotation of the propeller fan (10) can be reduced. In addition, the air-sending efficiency of the propeller fan (10) can be expected to be improved.

Third Modification

Figure 18:
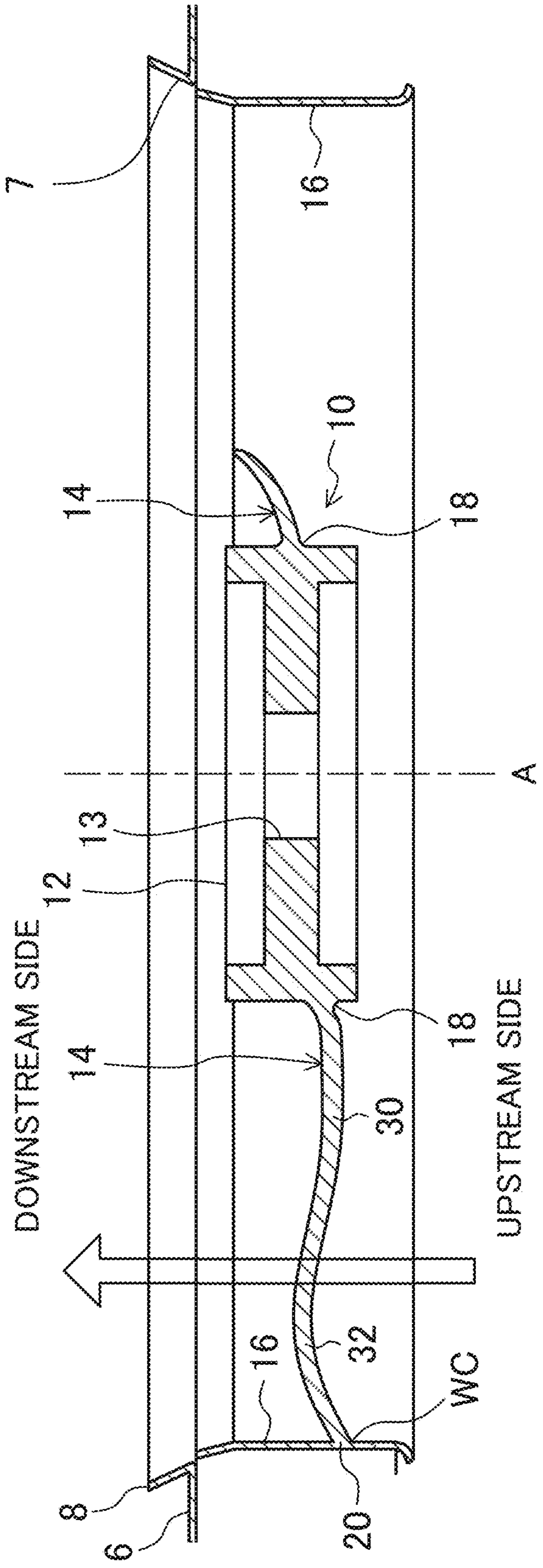
FIG. 18 is a cross-sectional view illustrating a portion of a chiller device of a third modification, the portion corresponding to FIG. 2.

As illustrated in FIG. 18, in the chiller device (1), the bell mouths (8) may be provided only on the downstream side in a direction in which the propeller fan (10) sends the air (the upper side in the present modification). In other words, each of the bell mouths (8) does not need to extend to the outer periphery side of the corresponding propeller fan (10) (strictly speaking, the outer side of the corresponding ring (16)). Each of the bell mouths (8) in the present modification is positioned in the vicinity of the downstream end of the corresponding ring (16). Each of the bell mouths (8) in the present modification is formed in a tapered shape that is tapered from the downstream side toward the upstream side in the direction in which the propeller fan (10) sends the air.

OTHER MODIFICATIONS

In the propeller fan (10), a portion of each of the blades (14) that is located on the inner side in the rotational radial direction and that corresponds to the first curved portion (30) may have a cross section in the rotational radial direction having, for example, a substantially flat plate-like shape other than the shape projecting toward the pressure surface (26) side in a convex manner. The propeller fan (10) can be used not only in the chiller device (1) but also in various other devices, such as an air-conditioner and a ventilator, that require an air-sending function.

Although the embodiment and the modifications have been described above, it is to be understood that various modifications can be made to the embodiment and the details without departing from the gist and the scope of the claims. In addition, the embodiment and the modifications described above may be suitably combined or replaced unless the functionality of the target of the present disclosure is reduced.

As described above, the present disclosure is useful for a propeller fan and a refrigeration apparatus.

The invention claimed is:

1. A propeller fan comprising:

a blade configured to rotate around a predetermined rotation axis; and a ring connected to a blade end of the blade, the blade including a curved portion on a side on which the blade end is located, the curved portion having, in a rotational radial direction of the blade, a cross-sectional shape projecting in a convex manner toward a side on which a pressure surface is located, in the curved portion, an axial-direction height at a maximum curve position being maximum on a side on which a trailing edge of the blade is located, the maximum curve position being a position at which the axial-direction height becomes maximum in the rotational radial direction, the axial-direction height being a height from a blade root on a camber line in a direction along the predetermined rotation axis, the maximum curve position being located in a range of $0.6 \leq r/R \leq 0.8$, R being a distance from the blade root to the blade end of the blade in a blade cross-section passing through the predetermined rotation axis, and r being a distance from the blade root of the blade to an position in the blade cross-section.

2. The propeller fan according to claim 1, wherein the axial-direction height at the maximum curve position increases in a direction extending from a leading edge of the blade to the trailing edge of the blade.

3. The propeller fan according to claim 2, wherein a serration is provided at the trailing edge of the blade.

4. The propeller fan according to claim 1, wherein the axial-direction height at the maximum curve position increases in a direction extending from a leading edge of the blade to the trailing edge of the blade.

5. The propeller fan according to claim 4, wherein a serration is provided at the trailing edge of the blade.

6. A refrigeration apparatus including the propeller fan according to claim 4.

7. The propeller fan according to claim 1, wherein a serration is provided at the trailing edge of the blade.

8. A refrigeration apparatus including the propeller fan according to claim 1.

9. A propeller fan comprising:

a blade configured to rotate around a predetermined rotation axis; and a ring connected to a blade end of the blade, an angle formed by the blade and the ring in a rotational radial direction of the blade on a side on which a suction surface of the blade is located becomes maximum on a side on which a trailing edge of the blade is located, a maximum curve position being located in a range of $0.6 \leq r/R \leq 0.8$, the maximum curve position being a position at which an axial-direction height becomes maximum in the rotational radial direction, the axial-direction height being a height from a blade root on a camber line in a direction along the predetermined rotation axis, R is a distance from the blade root to the blade end of the blade in a blade cross-section passing through the predetermined rotation axis, and r is a distance from the blade root of the blade to an position in the blade cross-section.

10. The propeller fan according to claim 9, wherein the angle increases in a direction extending from a leading edge of the blade to the trailing edge of the blade.

11. The propeller fan according to claim 10, wherein the blade includes a portion at which the angle is 130 degrees or larger on the side on which the trailing edge is located.

12. The propeller fan according to claim 11, wherein a serration is provided at the trailing edge of the blade.

13. The propeller fan according to claim 10, wherein a serration is provided at the trailing edge of the blade.

14. The propeller fan according to claim 9, wherein the blade includes a portion at which the angle is 130 degrees or larger on the side on which the trailing edge is located.

15. The propeller fan according to claim 14, wherein a serration is provided at the trailing edge of the blade.

16. The propeller fan according to claim 9, wherein a serration is provided at the trailing edge of the blade.

17. A refrigeration apparatus including the propeller fan according to claim 9.

* * * * *